Patented Jan. 15, 1929.

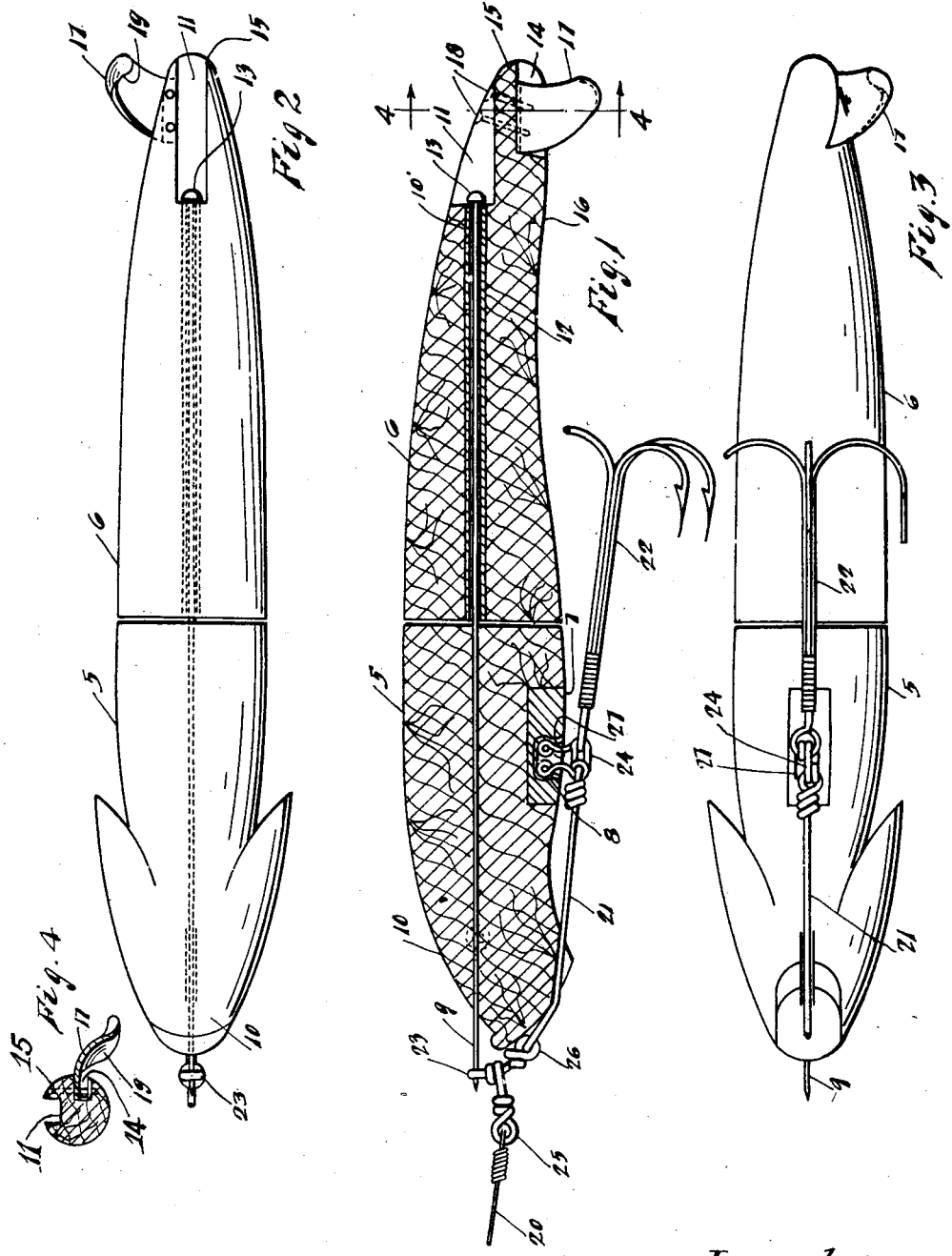

1,698,735

UNITED STATES PATENT OFFICE.

CONSTANCE C. ROBERTS, OF MOSINEE, WISCONSIN.

FISH LURE.

Application filed October 12, 1925, Serial No. 61,910. Renewed August 4, 1928.

My invention relates to fish lures, designed especially for use in catching muscallonge and other fish which strike their prey from underneath, and my invention has for its object the provision of an improved construction which is highly efficient in use and economical in manufacture.

Another object is the provision of a floatable, self-stabilizing lure, so constructed and associated with a tackle that the allured fish in striking or struggling will automatically effect the release of the lure thereby permitting it to float off on the water whence it may be subsequently reclaimed or picked up by the fisherman from his boat. Certain features of my improvements, herein illustrated and described but not herein claimed, are claimed in my companion application for Letters Patent of the United States, filed October 12, 1925, Serial No. 61,911.

Other objects will appear hereinafter.

The invention consists in the combinations and arrangement of parts hereinafter described and claimed.

The invention will be best understood by reference to the accompanying drawing forming a part of this specification, and in which, Fig. 1 depicts a longitudinal sectional view through a lure made in accordance with my present invention, and depicts also a tackle associated with the lure;

Fig. 2 represents a top plan view of the lure, with a tackle associated therewith;

Fig. 3 represents an underneath plan view of the lure with the associated tackle; and Fig. 4 is a detail sectional view of a fin by which rotary movement is given to the spinner when the lure is drawn through the water, this view being taken on the line 4—4 of Fig. 1.

The preferred form of my invention as illustrated in the accompanying drawing, comprises a floatable body made in simulation of a fish and composed of a self-stabilizing part 5 and a spinner part 6, the self-stabilizing part 5 representing the forward portion of the fish-like body while the spinner part 6 represents the rear portion thereof. The forward body part 5 has a weight 7 embedded in its underside in a central position, as shown, to serve as a stabilizer. Arranged within the weight is a keeper member 8 in the form of a socket adapted to receive and releasably retain a catch member provided on the tackle apparatus, hereinafter to be described.

Extending longitudinally through the stabilizing body part 5 is a spindle 9 which, as shown, extends for a distance beyond the head 10 in order to serve as a support for the tackle apparatus, and which also extends well to the rear of this body part in order to serve as an axis on which to spin the rear body part 6. Preferably and as shown, the spindle 9 has a drive fit through the body part 5, although it may be made fast therewith in any other suitable manner. For the reception of the spindle 9, the rear body part 6 is provided with a bore 10′ which communicates at its rear end with a recesss 11 cut inwardly from the back of the lure as shown. Arranged within the bore 10′ is a suitable tubular member 12 which serves as a bearing for the spinner or body part 6. The spindle 9, within the recess 11, has a retaining head 13 for holding the body part 6 in operative position. In accordance with a feature of my improvements, the spinner or rear body part 6 not only tapers in a fish-like form towards its tail end 15, but it also has a pronounced curve or bend 16 laterally of its axis of rotation so that said portion 15 will have a lashing or a swishing action in the water when the body part 6 revolves. A fin member 17, secured within a recess 14 in the tail portion 15 by means of pins 18 or otherwise, is designed to respond to water pressure when the lure is drawn through the water, for the purpose of effecting the spinning of the rear body 6. To this end the fin 17 is made with an outwardly and downwardly directed portion 19 adapted to receive the water pressure whereby to set-up sufficient resistance for rotating the body part 6 as the lure is drawn through the water.

The tackle apparatus in its preferred embodiment comprises a leader 20, a link 21 and the usual fish hook 22, the leader 20 being connected with the link 21 by means of a slip-loop member 23, while the link 21 is connected with the hook 22 by means of a catch member 24. As herein constructed, the slip-loop member 23 has an eye 25 with which the leader 20 is linked and a separate eye 26 with which the link 21 is engaged, the said eyes 25 and 26 projecting in opposite directions and lying substantially in the same plane as shown. The slip-loop member 23, which rises intermediate the positions of said eyes 25 and 26, is designed to slip over the protruding end of the spindle 9. The catch member 24 is preferably constructed with two opposing hook-like arms 27 designed to be slipped into the keeper 8 and to be releasably held thereby. This entire arrangement is such that when the hook-like arms 27 are engaged within the keeper 8, the slip-loop member 23 cannot be disengaged from the spindle 9; but when the said arms 27 are withdrawn from their keeper 8, the slip-loop 23 will readily slip off the spindle 9 thereby entirely freeing the lure from the tackle apparatus.

Muscallonge attack their prey from underneath and my improved lure and tackle apparatus has, it will be noted, been constructed and arranged to accord with this method of attack. When the fisherman reels in the lure, the hook 22 swingable upon the catch 24, rises to occupy a position underneath the lure, as illustrated in the drawing. When the fish strikes the lure underneath, the hook 22 is enclosed by its mouth and the force of the strike jars loose or effects the release of the catch member arms 27 from the keeper 8. Since the hook 22 is encompassed by the mouth of the fish the points thereof readily become embedded in or about the mouth of the fish. Should the arms of the catch member not be disengaged from the keeper as a result of the striking effort of the fish, they will positively be disengaged as a result of the maneuvers of the fish in its efforts to disengage the hook from its mouth.

Upon the disengagement of the catch arms from their keeper, the slip-loop readily slips off the spindle thereby releasing the lure which floats off and may subsequently be picked up from the water by the fisherman, who is fishing for muscallonge, usually employs a boat.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having described my invention what I claim as new and desire to secure by Letters Patent is:

1. A fish lure comprising a floatable body having a self-stabilizing part and a part rotatably arranged thereon; said rotatable part being formed with a pronounced lateral curve adapted to have a lashing action in the water, and fin means mounted in and projecting from the body of said rotatable part for effecting the rotation thereof when the lure is drawn through the water, substantially as described.

2. A fish lure comprising a fish-like body constructed of a forward part and a rear part; a weight stabilizing the forward body part; a spindle projecting from the forward body part and rotatably carrying the rear body part; the tail portion of the rear body part being curved laterally to have a swishing action on the water; and a fin member mounted in and projecting from said tail portion for effecting the rotation of said rear body part when the lure is drawn through the water, substantially as described.

In testimony whereof I have signed my name to this specification.

CONSTANCE C. ROBERTS.